United States Patent Office 2,939,785
Patented June 7, 1960

2,939,785
REFRACTORY METAL AND SILICON SELF-HEALING HIGH TEMPERATURE ALLOY

Merle H. Weatherly and Louis A. Conant, Indianapolis, Ind., assignors to Union Carbide Corporation, a corporation of New York No Drawing. Filed Dec. 4, 1956, Ser. No. 626,097

8 Claims. (Cl. 75—134)

The present invention relates to a novel composition of matter and to bodies and coatings formed therefrom. More particularly, the invention relates to a material having high oxidation resistance, corrosion resistance, and high shock resistance at elevated temperatures.

The advent of jet aircraft, rockets, nuclear energy and the like has focused attention on high temperature engineering materials. The continued advancement of such technologies require the development of new high temperature materials, since the virtual temperature limit of present materials has been reached. Unfortunately, the number of metals, metalloids, and ceramics suitable for the rigorous requirements of such applications are very few. Among the most promising are the refractory metals, or high alloys of tungsten, molybdenum, tantalum and niobium. Without exception, however, they are rapidly oxidized far below the required service temperatures, 1600° F. (871° C.) and above.

Molybdenum is of particular interest because it can be formed into useful shapes possessing excellent high temperature properties. Its very rapid oxidation in air or combustion gases above about 1200° F. (648° C.) precludes its use under such conditions. At approximately this temperature oxidation is self-sustaining with the evolution of the volatile oxide $MoO_3$. The metal is thus rapidly consumed.

In addition, similar problems are encountered requiring the employment of protective coatings for carbon, tungsten, tantalum, columbium and other refractory materials. The following will, by way of illustration, set for the specific problems with respect to molybdenum and its alloys.

Much effort has gone into the study of molybdenum protection. Many compositions and coating techniques have been employed. To the best of our knowledge, none of these have been too successful. This has been particularly true in aircraft applications, where the requirements are very severe. The requirements for turbine buckets, to operate in the 2000° F. range, will serve to illustrate the nature of the problem. Here the coating must withstand oxidation in combustion gases. It must be absolutely free of defects, or be able to self-heal before destructive oxidation occurs. It must withstand the stress induced by thermal gradients and have high resistance to thermal shock, since temperatures may vary as much as 1000° F. in a few seconds. It must resist severe fatigue stresses, and possess enough ductility to elongate about 1 to 2% without failure. It must resist mechanical shock and especially the impact of foreign particles entrained in the gas stream. The corrosive and erosive action of the gas stream must also be withstood.

Turbine buckets demand the most exacting requirements. Other components of turbo jet, turbo prop and ram jet engines, for example, flame-gutters, exhaust nozzle liners, the combustion chamber and exit nozzles of ram jets, present problems that are not quite as severe.

Many prior compositions have been tried as coating materials for molybdenum and molybdenum base alloys, such as molybdenum disilicide coatings, ceramic type coatings, enamels, chrome coatings, nickel-chrome alloys, alloys of aluminum-nickel-silicon, nickel-boron, to name the best known. Molybdenum disilicide and zirconium oxide-calcium zirconate have good oxidation resistance, but are subject to failure by mechanical shock, are brittle and require high temperature for application to the base. If a composition requires an application temperature above 2000° F. for securing it to the molybdenum base, the high temperature is very likely to cause recrystallization and grain growth in the molybdenum which renders it very brittle and not suited to many of the forementioned applications. Others of these coating materials, like nickel-boron, are too low melting.

In general, the more ductile tough coatings are not sufficiently oxidation resistant or have low melting points, whereas those possessing good oxidation resistance do not possess self-healing properties at sufficiently low temperatures and/or are too brittle and sensitive to impact. One of the most common causes of failure occurs when the coating develops pin point defects and cracks as a result of thermal stresses, elongation and the impact of particles. Many such failures could be prevented if the coating self-healed or glazed over the defect before destructive oxidation of the base occurred. It should be noted that several of the coatings, notably molybdenum disilicide, will self-heal, but not at a sufficiently low temperature. For example, $MoSi_2$ does not effectively heal below 2192° F. to 2462° F. (1200° C.–1350° C.). It is obvious that such a coating would not be suitable below this temperature if small defects developed. It is, therefore, clear that a coating that self-healed at a relatively low temperature (1700–1800° F.) has great advantage and is to be desired.

It is, therefore, an object of the present invention to provide a novel composition of matter that will effectively protect molybdenum and the like from oxidation at elevated temperatures.

Another object is to provide a composition of matter for effective protection of molybdenum and molybdenum base alloys through the formation of a self-healing surface layer in the event that small imperfections and defects in the coating develop.

A further object is to provide a composition of matter that can be applied to bodies at temperatures and under conditions that will not induce recrystallization and grain growth causing brittleness in the base material to be coated.

A still further object of the present invention is to provide a composition of matter capable of employment in forming sintered and cast objects which exhibit high oxidation resistance and other desirable characteristics at elevated temperatures, such as improved thermal shock resistance.

Other aims and advantages of the invention will be apparent from the following description and appended claims.

In accordance with the present invention, a composition of matter is provided comprising between 10 and 40 atom percent of at least one metal selected from the group consisting of molybdenum, tungsten, tantalum, niobium and vanadium, between 20 and 65 atom percent silicon, between 2 and 16 atom percent of at least one metal selected from the group consisting of chromium, titanium and zirconium, between 2 and 25 atom percent boron and between 3 and 30 atom percent aluminum. The remainder of the composition is oxygen or minor impurities such as carbon.

It has been found that a boron constituent and the constituent of the second metal grouping above (chromium, titanium or zirconium) can exist in the composition of the invention in the form of a metal boride, as a mixture of metal borides or as a mixture of elemental metals and boron.

A very suitable composition has been prepared from 40% by weight of molybdenum, 40% by weight silicon, 10% by weight chromium boride, which may be represented by $Cr_2B_3$, and 10% by weight of aluminum. In atomic percentages this was 18.3% Mo, 62.3% Si, 3.2% $Cr_2B_3$ and 16.3% Al. This composition may be made as a blend of powders, or preferably as a prealloyed powder. The alloy offers greater uniformity when it is used for coating purposes. The optimum raw material composition appears to be as noted above, namely 18.3% Mo—62.3% Si—3.2% $Cr_2B_3$—16.3% Al, in atomic percentages, although protective coatings have been made from compositions in the range of 30–65% Si, 10–35% Mo, 2–16% Cr+2–25% B, 5–30% Al.

By a variation in composition it is possible to obtain materials or coatings mith a higher melting point or greater oxidation resistance, but generally at the expense of some other property, such as self-healing or thermal shock resistance. It may be desirable to use a composition other than the 40–40–10–10 percentage by weight, depending on the application. For example, where improved oxidation resistance at 2552° F. (1400° C.) is required, the silicon can be increased to 45 percent, the molybdenum or other group metal to 45 percent and the $Cr_2B_3$ or other boride and aluminum decreased to 5 percent each.

The novel composition of matter of the invention may be utilized to form cast or sintered bodies or as protective coatings for molybdenum and molybdenum base alloys and similar refractory materials.

Cast or sintered formed bodies of the invention have been found to possess high oxidation resistance and strength at elevated temperatures in the compositional range of between 10 and 35 atom percent of at least one metal selected from the group consisting of molybdenum, tungsten, tantalum, niobium and vanadium; between 30 and 65 atom percent silicon; between 2 and 16 atom percent of at least one metal selected from the group consisting of chromium, titanium and zirconium; between 2 and 25 atom percent boron; and between 5 and 30 atom percent aluminum.

In an example of the utilization of this composition in the formation of a sintered body, a portion of a mixture consisting of 40 weight percent molybdenum, 40 weight percent silicon, 10 weight percent chromium boride, and 10 weight percent aluminum was placed in a carbon die and hot-pressed under conditions of 2000–3000 p.s.i. and 1500° C. for 15 minutes. The resulting body was a disc about 1½ inches in diameter and ½-inch thick. The product composition was 18.3 atom percent molybdenum, 48.4 atom percent silicon, 5.8 atom percent chromium, 8.2 atom percent boron and 10.5 atom percent aluminum. This mass was then cut so as to form several test samples about 1-inch long, 0.2-inch high and 0.15 inch thick. These test samples were supported on rods spaced ⅝-inch apart and a load was applied between these supports until the samples fracture. The average bending strength or modulus of rupture obtained in this manner was 45,933 p.s.i. for the 40–40–10–10 hot-pressed body. These samples also had an average surface hardness of 1000 VPN on the Vickers Scale. The relatively low density of the product (4.9 g./cc.) combined with its relatively high modulus of rupture, makes it useful for aircraft structural applications where the strength/density ratio becomes important.

Coatings in accordance with the invention have been found to possess high oxidation resistance, high strength and self-healing characteristics at elevated temperatures in the compositional range of between 10 and 40 atom percent of at least one metal selected from the group consisting of molybdenum, tungsten, tantalum, niobium and vanadium; between 20 and 40 atom percent silicon; between 2 and 15 atom percent of at least one metal selected from the group consisting of chromium, titanium and zirconium; between 4 and 18 atom percent boron; and between 3 and 17 atom percent aluminum.

The composition of matter of the invention has been applied as a coating for molybdenum, molybdenum-base alloys and similar refractory materials by the detonation coating method described in U.S. Patent 2,714,563 issued to R. M. Poorman et al. on August 2, 1955. In that process, a powdered composition to be coated is suspended in a body of detonatable gas in an elongated barrel capable of sustaining a detonation, and, upon ignition of the body of detonatable gas, the suspended powder is ejected from the barrel under the impetus of the detonation and directed against the surface of the body to be coated.

Coatings may be provided utilizing the composition of matter of the invention in conjunction with other known flame spraying processes such as the Wall-Colmonoy process.

A spray gun employing an oxy-acetylene flame as the heat source was used in this coating process. The fuel-gas mixture was adjusted to produce essentially a chemically neutral flame. Powder consisting in composition of 40 weight percent Mo, 40 weight percent Si, 10 weight percent $Cr_2B_3$, and 10 weight percent Al was aspirated into the flame zone of the spray gun by means of an argon stream passing through a powder dispenser. The outlet of the spray gun was held about 6-inches from a molybdenum metal workpiece ¼-inch in diameter and 3-inches long. The workpiece was rotated and the spray gun was traversed along the axis of the workpiece so as to apply a coating 0.008-inches thick. The coating produced by this method is characteristically porous and further heat treatment is necessary in order to obtain a satisfactory coating. In this instance the coated molybdenum workpiece was placed in a furnace and heated to 1100° C. for 3 hours in a hydrogen atmosphere. The resulting coating protected the molybdenum metal from oxidation at 1000° C. for 1000 hours in a static oxidation test. In addition, dipping, painting, or spraying the refractory body with a slurry of the suspended alloy or blended powder followed by heat treatment in an inert or reducing atmosphere may be employed to provide coatings from the novel composition of the invention.

Still another method comprises dissolving or alloying the constituents in an excess of low melting point molten metal, such as copper or aluminum, and dipping the body to be coated in such a melt.

It has been found that the detonation process of applying the novel composition of matter as a coating for surfacing bodies offers many advantages particularly in the coating of molybdenum and molybdenum base materials.

In an example of the formation of such a composition of matter and the utilization of the composition as a coating material, molybdenum, silicon, chromium boride and aluminum powders of from −100 to −325 mesh size were mixed in a cone type blender for one hour. The mix comprising 40% by weight of molybdenum, 40% silicon, 10% $Cr_2B_3$ and 10% aluminum, was then moistened with toluene and compacted in a steel die. The green compacts were placed in a graphite crucible, dried overnight at 260° F. in a vacuum or inert atmosphere, and fired in a hydrogen-argon mixture for one hour at 1500° C. The alloyed sinter cake was reduced, by utilizing a jaw crusher and "Mikro pulverizer," or high speed hammer mill, to a powder of about −170 mesh. The powder was dispensed into the detonation gun and fired at an oxy-carbon ratio of 1.0. A work distance 1½-inches, and a powder feed rate of about 23 gms./min. were employed. The surface of the specimen to be plated was sandblasted with 120-grit alumina powder. During the plating operation the specimen was rotated and/or traversed.

It has been found that the powder undergoes a compositional change as it passes through the detonation gun. Thus the powder particles may reach temperatures as high as 3600° C. (6512° F.), a condition which, by volatilization, results in a percentage loss of several of the elements especially silicon. The ratio of the fuel gases may be such that a carburizing condition is present. This also leads to a pick up of alloyed carbon in the coatings.

A typical chemical analysis of a 40% Si—40% Mo—10% $Cr_2B_3$—10% Al alloyed starting powder resulted in the following coating composition (percentages by weight):

| | |
|---|---|
| Percent Si | 26.3±0.3. |
| Percent Al | 4.3±0.5. |
| Percent Cr | 7.9±0.2. |
| Percent Mo | 47.4±0.3. |
| Percent B | 1.5±0.2. |
| Percent Fe | 2.0 spectrograph. |
| Percent Cu, Ni, Ti | 1.0 spectrograph. |
| Percent O+C | Balance by difference (assumed). |

The following table sets forth typical properties of swaged ¼-inch diameter molybdenum rod specimens three-inches in length coated with a 40% Mo—40% Si—10% $Cr_2B_3$—10% Al (percentage by weight) composition powder.

TABLE I.—PROPERTIES OF 40% Mo—40% Si—10% $Cr_2B_3$—10% Al COATINGS

Oxidation resistance in air:
  1832° F. (1000° C.)_____ over 1000 hrs.
  2190° F. (1200° C.)_____ over 500 hrs.
  2400° F. (1315° C.)_____ 500 hrs.
  2600° F. (1427° C.)_____ 50 hrs.
Thermal shock resistance (cold water quench from 1832° F.): Will survive at least 25 cycles.
Hardness of coating:
  Rockwell A=84–85
  Vickers P.N. 1150
Self-healing: Will self-heal small cracks and defects as low as 1700° F.
Ballistic impact resistance: Benjamin Air Rifle—0.172″ Slug
Coatings failed at 135 ft./sec. at 1832° F.
Coating intact at room temperature

STRESS-RUPTURE TESTS

| Temp. (°C.) | Hours | Stress (p.s.i.) | Elongation (percent) |
|---|---|---|---|
| 1,600 | 670 | 20,000 | 0.98. |
| 1,800 | 307 | 6,000 | 2.00 (approx.) |

Elongation of about 1–2% is considered necessary for applications such as turbine blades.

The following Table II sets forth the composition of coatings obtained in several runs employing both the detonation flame plating process and the Wall-Colmonoy process employing specific composition of starting coating powders.

TABLE II.—COMPOSITION OF COATINGS

FLAME PLATED COATINGS (DETONATION)

| Run No. | Nominal Starting Comp., Wt. Percent | | | | Analysis (Wt. Percent) | | | | | |
|---|---|---|---|---|---|---|---|---|---|---|
| | Mo | Si | $Cr_2B_3$ | Al | Mo | Si | Cr | B | Al | C |
| 1 | 40 | 40 | 10 | 10 | 50.3 | 22.5 | 7.74 | 2.33 | | |
| 2 | 40 | 40 | 10 | 10 | 47.4 | 26.3 | 7.9 | 1.5 | 4.3 | |
| 3 | 40 | 40 | 10 | 10 | 51.9 | 22.2 | 7.6 | | | |
| 4 | 40 | 40 | 10 | 10 | 43.7 | 23.1 | 8.5 | 1.8 | 5.0 | 3.32 |
| 5 | 40 | 40 | 10 | 10 | 46.2 | 24.0 | 8.84 | | | 2.76 |
| 6 | 40 | 40 | 10 | 10 | 45.1 | 24.4 | 7.2 | | | 2.97 |
| 7 | 40 | 40 | 10 | 10 | 44.9 | 27.1 | 7.88 | 2.5 | 4.8 | 3.07 |
| 8 | 30 | 50 | 10 | 10 | 43.7 | 22.9 | 8.25 | 2.4 | 5.6 | 4.63 |
| 9 | 30 | 50 | 10 | 10 | 38.7 | 30.5 | 8.7 | 3.1 | 7.8 | 2.26 |
| 10 | 42.5 | 42.5 | 5 | 10 | 52.2 | 21.5 | 4.6 | 2.0 | 5.1 | |
| 11 | 45 | 35 | 10 | 10 | 39.8 | 22.0 | 7.85 | 6.0 | 5.3 | 3.07 |
| 12 | 40 | 20 | 25 | 15 | 43.3 | 15.35 | 18.5 | 4.5 | 11.3 | |
| 13 | 55 | 30 | 10 | 5 | 59.7 | 20.7 | 6.46 | 1.6 | 2.6 | 2.18 |
| 14 | 55 | 30 | 10 | 5 | 54.0 | 22.3 | 7.18 | 2.7 | 4.0 | 0.87 |
| 15 | 50 | 30 | 10 | 10 | 46.0 | 21.1 | 6.7 | 1.7 | 6.9 | 0.02 |
| 16 | 50 | 30 | 10 | 10 | 66.3 | 15.5 | 8.5 | 2.9 | 2.5 | 1.55 |
| 17 | 66 | 20 | 10 | 10 | 71.4 | 12.9 | 5.8 | 1.9 | 3.2 | 1.20 |
| 18 | 60 | 20 | 10 | 10 | 63.2 | 13.0 | 7.2 | 2.1 | 5.4 | 0.05 |
| 19 | 35 | 35 | 10 | 20 | 49.4 | 21.2 | 7.5 | 1.9 | 9.7 | 0.12 |

WALL-COLMONOY PROCESS COATINGS

| 1 | 40 | 40 | 10 | 10 | 37.5 | 28.2 | 8.5 | 2 | 5 | |
| 2 | 55 | 27 | 12 | 6 | 57.0 | 14.8 | 9.8 | 2.2 | 5 | |

The following examples illustrate the utility of coatings containing zirconium boride, titanium boride and tungsten in place of the chromium boride and molybdenum employed in the coating materials obtained in Table II.

*Example I*

A mixture of 37.5 weight percent Mo, 37.5 weight percent Si, 15 weight percent $ZrB_2$, and 10 weight percent Al (17.5 at. percent Mo, 60.0 at. percent Si, 5.9 at. percent $ZrB_2$ and 16.6 at. percent Al) was plated on a molybdenum metal base by means of the detonation process using an oxygen/carbon ratio of 1.05. The resulting coating protected the base metal from oxidation at 1200° C. for 258 hours.

*Example II*

Another sample of the mixture of Example I above was plated on a molybdenum metal base by means of the detonation process using an oxygen-carbon ratio of 1.0. The resulting coating which had the final composition partial analysis of 41.3 weight percent Mo, 20.1 weight percent Si, 13.3 weight percent Zr, and 3.0 weight percent B withstood 21 water quenching cycles from 1000° C. without cracking. This coating had an as-plated Rockwell A hardness of 83–86.5.

*Example III*

A mixture of 40 weight percent Mo, 40 weight percent Si, 10 weight percent $TiB_2$, and 10 weight percent Al (17.7 at. percent Mo, 60.4 at. percent Si, 6.1 at. percent $TiB_2$, and 15.8 at. percent Al) was plated on a molybdenum metal base by means of the detonation process using an oxygen/carbon ratio of 1.0. The resulting coating which had the final composition partial analysis of 48.6 weight percent Mo, 24.6 weight percent Si, and 3.3 weight percent C protected the metal base from oxidation at 1200° C. for 258 hours. This coating, which had an as-plated Rockwell A hardness of 80–82, also withstood 24 water quenching cycles from 1000° C. without cracking.

*Example IV*

A mixture of 55 weight percent W, 29 weight percent Si, 8 weight percent $Cr_2B_3$, and 8 weight percent Al (17.7 at. percent W, 61 at. percent Si, 3.5 at. percent $Cr_2B_3$, and 17.6 at. percent Al) was plated on a molybdenum metal base by means of the detonation process using an oxygen/carbon ratio of 1.0. The resulting coating withstood 12 water quenching cycles from 1000° C. without cracking.

As a comparison with the above compositions, the preferred Mo—Si—Cr—B—Al starting composition of 40 weight percent Mo, 40 weight percent Si, 10 weight percent $Cr_2B_3$ and 10 weight percent Al has the atomic percentage composition of 18.3 percent Mo, 62.3 percent Si, 3.2 percent $Cr_2B_3$, and 16.3 percent Al.

It has been found that all of the coatings obtained with small surface defects such as pin point holes and hair line cracks will self-heal with a rapid fusion of the coating material to glaze over the defect at a temperature as low as 1700° F. Increases in temperatures effect an increase in the rapidity and extent of self-healing.

The function of the several constituents in the coating is rather complex and not thoroughly understood. It is, however, believed that the molybdenum and silicon confer oxidation resistance by forming silicides, though not necessarily $MoSi_2$. The chromium boride and aluminum render the material more plastic and tough, and appear to adjust the thermal expansion of the coating to the base over a wide range of temperature, so that good thermal shock resistance is obtained. Chromium boride also favorably modifies the self-healing nature of the glaze. The glaze and oxide is the result of the oxidation of the elements present so that complex oxides and glasses are formed. Thus $Cr_2B_3$ gives $Cr_2O_3$ and $B_2O_3$, Al results in $Al_2O_3$, Si in $SiO_2$, Mo in $MoO_3$. An X-ray study of the oxide or glaze formed on this coating after oxidation revealed that it consisted primary of mullite ($3Al_2O_3—2SiO_2$) and cristobalite ($SiO_2$), with silicon and unidentified materials also present. Smaller amounts of other oxides may not be revealed by the X-ray because of the weak line intensities.

The glass or vitreous phases in the coating, responsible for the glaze, have not been identified since they are non-crystalline in the ordinary sense. Presumably they contain $SiO_2$—$B_2O_3$ combinations with the other oxides.

Micro examination of the cross-sectioned coated specimens revealed the development of an alloyed layer that appears after heating at 1000°–1200° C. for over twenty hours (heating during oxidation tests). It apparently acts as an inner protective barrier since superficial cracks and defects do not cause oxidation failure.

It has been found that, when employing an oxy-fuel flame to impart heat to the composition of matter to provide surface coatings, a minor amount of carbon produced by the oxy-fuel reaction is picked up by the coating material. Such carbon pick-up constitutes up to a few percent of the resultant coating and has not been found to deleteriously affect the coating in its operation at high temperatures.

What is claimed is:

1. A self-healing high temperature oxidation-resistant composition of matter exhibiting self-healing properties at temperatures as low as 1700° F. consisting essentially of between 10 and 40 atom percent of at least one metal selected from the group consisting of molybdenum, tungsten, tantalum, niobium and vanadium; between 20 and 65 atom percent silicon; between 2 and 16 atom percent of at least one metal selected from the group consisting of chromium, titanium and zirconium; between 2 and 25 atom percent boron; and between 3 and 30 atom percent aluminum.

2. A self-healing formed body, exhibiting self-healing properties at temperatures as low as 1700° F. and having high resistance to oxidation and high strength at elevated temperatures, consisting essentially of between 10 and 35 atom percent of at least one metal selected from the group consisting of molybdenum, tungsten, tantalum, niobium and vanadium; between 30 and 65 atom percent silicon; between 2 and 16 atom percent of at least one metal selected from the group consisting of chromium, titanium and zirconium; between 2 and 25 atom percent boron; and between 5 and 30 atom percent aluminum.

3. A coated body having a surface coating characterized by its self-healing properties and high resistance to oxidation at elevated temperatures, consisting essentially of between 10 and 40 atom percent of at least one metal selected from the group consisting of molybdenum, tungsten, tantalum, niobium and vanadium; between 20 and 40 atom percent silicon; between 2 and 15 atom percent of at least one metal selected from the group consisting of chromium, titanium and zirconium; between 4 and 18 atom percent boron; and between 3 and 17 atom percent aluminum.

4. A self-healing high temperature oxidation-resistant composition of matter exhibiting self-healing properties at temperatures as low as 1700° F. consisting essentially of about 18 atom percent of at least one metal selected from the group consisting of molybdenum, tungsten, tantalum, niobium and vanadium; about 30 to 55 atom percent silicon; about 5 atom percent of at least one metal selected from the group consisting of chromium, titanium and zirconium; about 6 to 8 atom percent boron, and about 6 to 10 atom percent aluminum.

5. A formed self-healing body exhibiting self-healing properties at temperatures as low as 1700° F. high resistance to oxidation and high strength at elevated temperatures, consisting essentially of about 18 atom percent of at least one metal selected from the group consisting of molybdenum, tungsten, tantalum, niobium, and vanadium; about 55 atom percent silicon; about 5 atom percent of at least one metal selected from the group consisting of chromium, titanium and zirconium; about 8 atom percent boron; and about 10 atom percent aluminum.

6. A coated body having a surface coating characterized by its self-healing properties and high resistance to oxidation at elevated temperatures, consisting essentially of about 18 atom percent of at least one metal selected from the group consisting of molybdenum, tungsten, tantalum, niobium and vanadium; about 30 atom percent silicon; about 5 atom percent of at least one metal selected from the group consisting of chromium, titanium and zirconium; about 6 atom percent boron; and about 6 atom percent aluminum.

7. A high temperature oxidation-resistant, low temperature self-healing coating consisting of between 10 and 40 atom percent of at least one metal selected from the group consisting of molybdenum, tungsten, tantalum, niobium and vanadium; between 20 and 65 atom percent silicon; between 2 and 16 atom percent of at least one metal selected from the group consisting of chromium, titanium and zirconium; between 2 and 25 atom percent boron; and between 3 and 30 atom percent aluminum, said coating being adapted to form a self-healing surface layer in the event that small imperfections and defects develop in the coating at temperatures as low as 1700° F.

8. The combination of a surface coating on a molybdenum base metal body normally subject to rapid oxidation above about 1200° F., said coating consisting of between 10 and 40 atom percent of at least one metal selected from the group consisting of molybdenum, tungsten, tantalum, niobium and vanadium; between 20 and 65 atom percent silicon; between 2 and 16 atom percent of at least one metal selected from the group consisting of chromium, titanium and zirconium; between 2 and 25 atom percent boron, and between 3 and 30 atom percent aluminum, said coating coacting with said molybdenum base metal body to render it substantially impervious to oxidation at elevated temperatures.

References Cited in the file of this patent

UNITED STATES PATENTS

| 2,179,836 | Wisler | Nov. 14, 1939 |
| 2,481,976 | Cape | Sept. 13, 1949 |
| 2,783,144 | Payson | Feb. 26, 1957 |

FOREIGN PATENTS

| 179,100 | Australia | July 10, 1954 |
| 181,431 | Australia | Aug. 15, 1954 |